Jan. 7, 1969     R. MINNITE     3,420,331
SEGMENTED MECHANICAL PROBOSCIS
Filed Dec. 12, 1966     Sheet _1_ of 4

RALPH MINNITE
INVENTOR

ATTORNEYS

RALPH MINNITE
INVENTOR

ATTORNEYS

Jan. 7, 1969 R. MINNITE 3,420,331
SEGMENTED MECHANICAL PROBOSCIS
Filed Dec. 12, 1966 Sheet 4 of 4
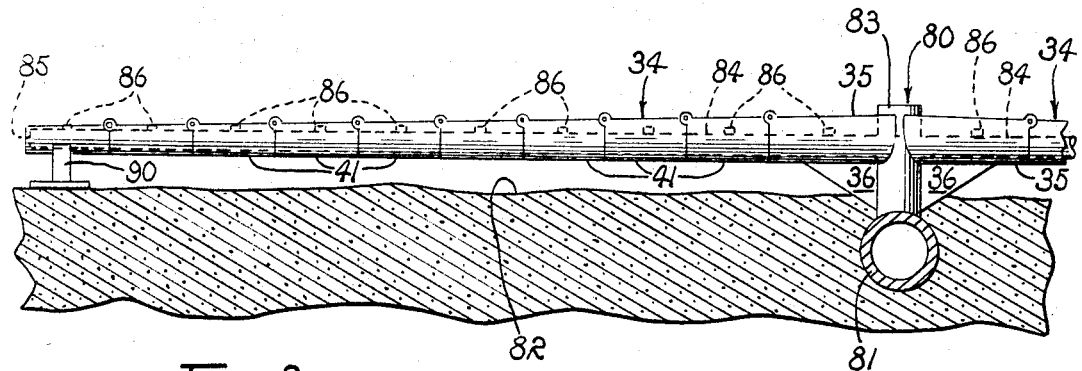
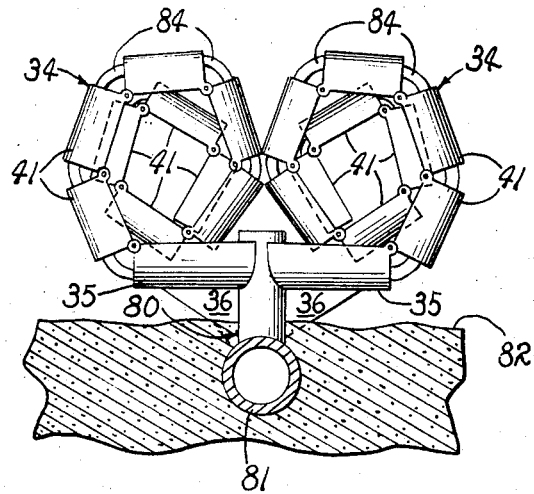
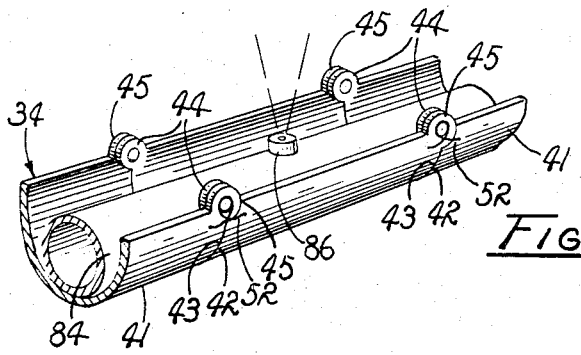
RALPH MINNITE
INVENTOR
Huebner & Worrel
ATTORNEYS

United States Patent Office 3,420,331
Patented Jan. 7, 1969

3,420,331
SEGMENTED MECHANICAL PROBOSCIS
Ralph Minnite, P.O. Box 198
Cantua Creek, Calif. 93608
Filed Dec. 12, 1966, Ser. No. 601,017
U.S. Cl. 182—41    8 Claims
Int. Cl. E06c 5/06; E01d 15/14

ABSTRACT OF THE DISCLOSURE

A segmented mechanical proboscis providing an elongated flexible fluid tight conduit which when deflated is in a coiled configuration and which is adapted to be pressurized to uncoil and subsequently to assume a substantially straightened configuration including a plurality of support elements pivotally interconnected in end-to-end relation mounted along the conduit for supporting a work platform disposable in an elevated position upon straightening of said conduit with the conduit returning to its coiled configuration upon deflation.

---

In many fields of endeavor, there is a need for a device which is quite compact but which can quickly and easily be deployed to a fully operational extension. Furthermore, there is a need for such a device which is of uncomplicated relatively inexpensive construction.

For example, in instances where it is necessary to perform work from an elevated position, such as in fruit picking, telephone and power line repairing, fire fighting and general servicing operations, conventional devices are cumbersome and usually slow to deploy. In all of these instances ladders have, in the past, been most frequently used. However, they are usually cumbersome and must ordinarily be rested against an object when in use. Furthermore, they must be climbed which is both time consuming and exhausting. More recently the hydraulic, telescopic boom type of device has been employed in operations of this type. In many respects this type of device is excellent. The worker can ride up as the boom is elevated and it need not be rested against a support. However, these devices are frequently bulky, relatively slow to deploy, expensive, and are usually susceptible to developing leaks in the pressurized hydraulic lines.

Another field to which the segmented mechanical proboscis of the present invention is adaptable is in the rapid crossing of lakes, rivers, swamps and the like. Rapid mobility across such natural obstacles is particularly critical in the military. Conventionally, there have been great difficulties in transporting troops rapidly across bodies of water. In the past, they have either been circumvented, waded across, traversed in boats or spanned by bridges. Obviously, these are time consuming procedures. Portable bridges of various types have been developed. These are fairly satisfactory in that they can be used to traverse lakes, rivers, and swamps and can support fairly heavy loads. However, for troops in rapid march they are virtually useless since they take a long time to deploy and require extensive equipment which is not easily transported through rugged terrain. Moreover, these portable bridges are expensive to build.

Still another field to which the segmented mechanical proboscis of the present invention is adaptable is irrigation and particularly large scale agricultural irrigation. Ordinarily, irrigation or sprinkling of such crops as alfalfa is performed by elaborate sprinkling systems. Such sprinkling systems satisfactorily perform the sprinkling operation but are imperfect in several respects. They are expensive to construct and to install. The portable type must be removed from the field in order to allow the performance of such agricultural operations as harvesting, cultivating, spraying and the like. This is obviously time-consuming, tedious, and therefore expensive. The permanent type of system, while not requiring removal, does require that care be taken not to damage the system during the performance of other agricultural operations. This, of course, slows the work thus increasing the expense to the farmer.

Therefore, it is the object of the present invention to provide a segmented mechanical proboscis which is adaptable to a wide variety of operations which require a compact quickly extendible structure.

Another object is to provide such a segmented mechanical proboscis which can be operated to extend from a coiled to a straightened configuration.

Another object is to provide such a segmented mechanical proboscis which is deployed by pneumatic means.

Another object is to provide such a segmented mechanical proboscis which takes the form of a working tower.

Another object is to provide such a segmented mechanical proboscis which can be operated to return to an initial compact coiled configuration.

Another object is to provide such a segmented mechanical proboscis which takes the form of a floating bridge.

Another object is to provide such a segmented mechanical proboscis which takes the form of an irrigating system.

A further object is to provide such a mechanical proboscis which is relatively inexpensive and is easy to operate.

Still further objects of the present invention are to provide improved elements and arrangements thereof in an apparatus for the purposes set forth which is fully effective in achieving its intended purposes.

These, together with other objects and advantages of the present invention, will become more fully apparent upon reference to the following description in the specification and accompanying drawings.

In the drawings:

FIG. 9 is a diagrammatic illustration of a third form of the invention deployed to its fully operational configuration.

FIG. 10 is a diagrammatic illustration of the third form of the invention in its coiled or retracted configuration.

FIG. 11 is a somewhat enlarged fragmentary perspective view of the third form of the invention.

Figure 1:
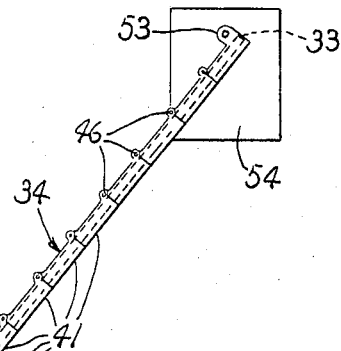
FIG. 1 is a side elevation of the first form of the device of the invention showing the segmented support boom fully, operationally deployed.

The segmented mechanical proboscis of the present invention is adaptable to a wide variety of specific structural embodiments as will subsequently become apparent. However, in order for clarity in the understanding of the breadth of the invention it should be emphasized that the embodiments herein described are merely indicative of the wide variety of adaptations of the invention. The segmented mechanical proboscis consists of a flexible conduit or conduits which are capable of being made rigid upon the supplying of pressure to the interiors thereof. The conduit or conduits include segments which are positioned throughout the lengths of the conduits. The segmented mechanical proboscis thus structured is capable of being extended from a coiled relatively compact arrangement to a fully operationally deployed arrangement for the performance of innumerable functions. With this in mind, attention is invited to the first form of the invention.

FIRST FORM

Referring in greater particularity to the drawings, a mobile working tower embodying the principles of the present invention is generally indicated by the numeral 10. The tower provides an automotive vehicle 11 which may be, for example, a trailer, service truck, or fire engine. The vehicle includes a vertically extending cylindrical pivot mount 12, having a centrally located, upwardly facing circular bore 13. A cylindrical mounting head 14, having side wall 15 and an upper end 16, is rotatably mounted on the pivot mount as by means of bearings, not shown. A conduit hole 17 is centrally located in the upper end of the mounting head. A large circular rotation gear 18 is integrally provided circumferentially on a downwardly extending end of the mounting head. A conventional drive motor 19 is mounted on the automotive vehicle in a position adjacent to the rotation gear. A conventional worm gear 20 is operably mounted on the drive motor in meshing engagement with the rotation gear.

A rotation assembly 21 is mounted, as by bolting, on the upwardly extending end of the mounting head 14. A rigid support table 22 is rotatably mounted on the rotation assembly and, when the mobile working tower 10 is not in use, it extends across the top of the mounting head parallel to the rotation gear 18 away from the rotation assembly. The support table has a bore hole 23 therein in alignment with conduit hole 17. A mounting bracket 24 is vertically affixed on the side wall 15 of the mounting head above the rotation gear so that it extends away from the mounting head below the support table. A conventional pneumatic ram 25 is mounted at one of its ends on the remote end of the mounting bracket and at the other of its ends on the mounting table.

Any suitable form of air pressurizing unit 26 is mounted on the automotive vehicle 11 adjacent to the pneumatic ram 25 and is in operable connection therewith through lines 27. A high presure airtight pneumatic conduit 30 is operably mounted at one of its ends in connection with the air pressurizing unit and extends at the other of its ends upwardly through the mounting head 14. An airtight swivel assembly 31 is affixed in the circular bore 13 of the pivot mount in operable connection with the pneumatic conduit. A durable, flexible lifting conduit 32 is rotatably mounted in the swivel assembly and extends through the conduit hole 17 in the mounting head and the bore hole 23 of the support table 22 terminating in a distal airtight end 33 a predetermined linear distance from the support table.

Figure 2:
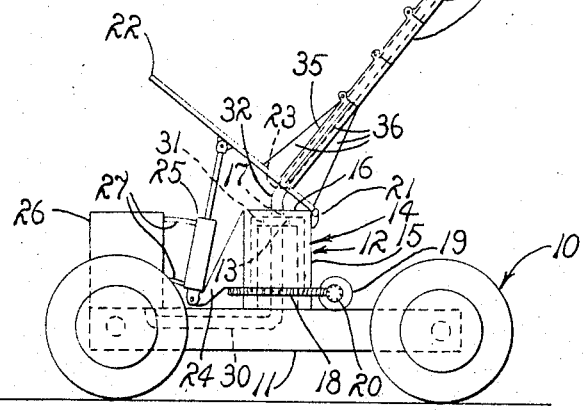
FIG. 2 is a side elevation of the first form of the device of the present invention showing the segmented support boom in its coiled or retracted configuration.
Figure 2:
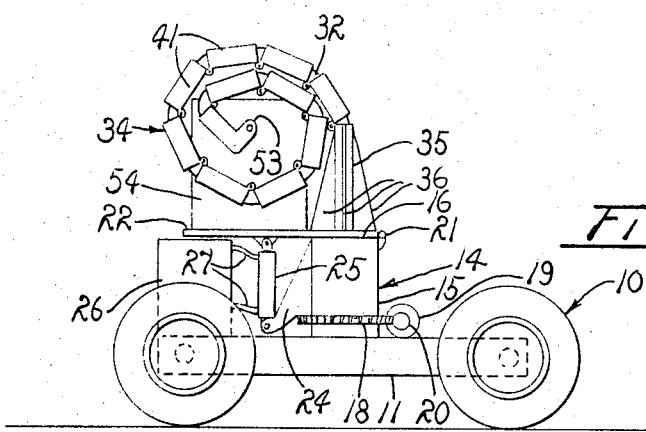
Figure 3:
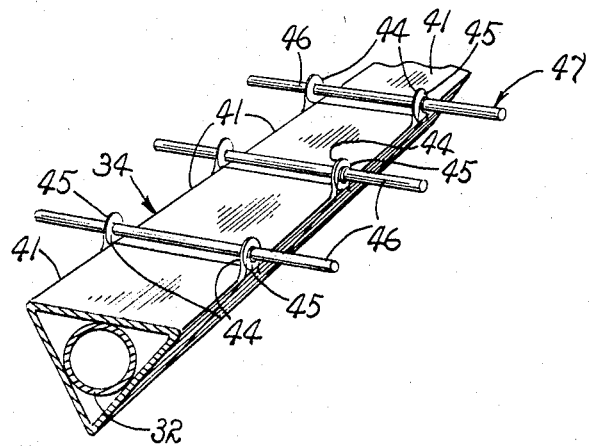
FIG. 3 is a fragmentary perspective of the segmented support boom of the first form of the invention showing its triangular cross section and integral climbing ladder.
Figure 4:
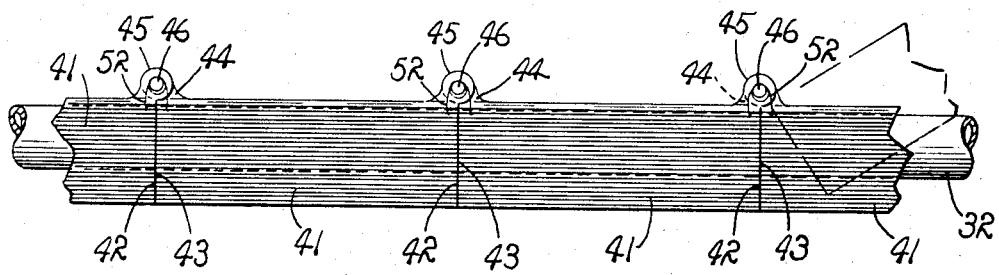
FIG. 4 is a somewhat enlarged fragmentary side elevation of the segmented support boom of the first form of the invention.
Figure 5:
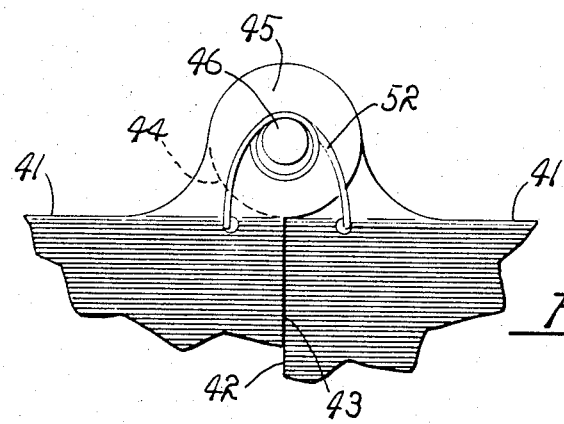
FIG. 5 is a somewhat further enlarged fragmentary view of a typical pivot assembly and torsion spring of the segmented support boom of the first form of the invention.

A support boom 34 is mounted about the lift conduit 32, as shown in FIGS. 1, 2, 3, and 4. The support boom includes a boom mount 35 which is affixed, as by welding, on the support table about the lifting conduit and extends away from and normal to the support table. Several support braces 36 are secured, as by welding, in supporting relation on the support table against the boom mount. The boom mount is triangular in cross section, as best shown in FIG. 3. A plurality of support segments 41 are mounted in interconnecting end-to-end relation about the lifting conduit, as best shown in FIGS. 1 and 2. Each of the support segments is preferably triangular in cross section for structural rigidity and has an inner end 42 and an outer end 43. A pair of relatively narrowly spaced pivots 44 is integrally provided on the lower end of each support segment. A pair of parallel relatively widely spaced pivots 45 is integrally provided on the outer end of each support segment. The remote upwardly extending end of the boom mount also has a pair of the relatively widely spaced pivots. The narrowly spaced pivots of the inner end of each support segment are rotatably mounted in the widely spaced pivots of the outer end of the support segment or boom support adjacent thereto. A bar 46 extends through each of the pivotally connecting pivots 44 and 45 of the boom support and support segments so that its distal ends extend laterally of the support segments thereby forming a climbing ladder 47. A torsion spring 52 is positioned about each bar adjacent to each of the interconnecting pivots 44 and 45 and is affixed individually at its distal ends to the connected support segments, as shown best in FIGS. 4 and 5.

The support segment 41 farthest from the boom mount 35 encloses the airtight end 33 of the lifting conduit 32. This support segment also provides an integral rotation assembly 53, as shown in FIGS. 1 and 2. A working platform or bucket 54 is pivotally mounted in the rotation assembly laterally adjacent to the boom. The rotation assembly is counterbalanced to allow for the weight of the bucket and anything carried therein in order to prevent twisting of the boom because of the laterally positioned bucket. The bucket has a center of gravity below its pivotal mounting so that it is maintained by gravity continually in the same orientation with respect to the ground. Thus, it is to be understood that the support boom 34 is positionable between a lowered coiled position, as shown in FIG. 2 and a raised straightened position, as shown in FIG. 1.

SECOND FORM

The second form of the present invention is intended for use as a portable floating bridge 60 which is operated as a segmented mechanical proboscis according to the same principles as the first form of the invention. The portable floating bridge includes a mobile vehicle 61 having any suitable air pressurizing unit 62 operably mounted thereon.

Figure 6:
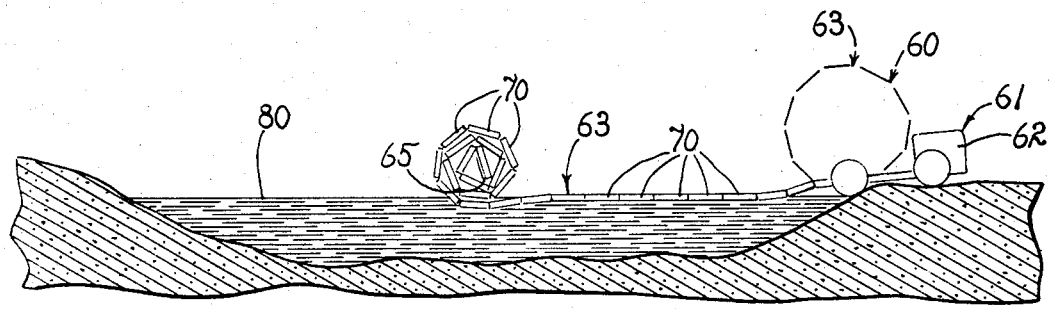
FIG. 6 is a diagrammatic illustration of a second form of the invention as deployed across a body of water.
Figure 7:
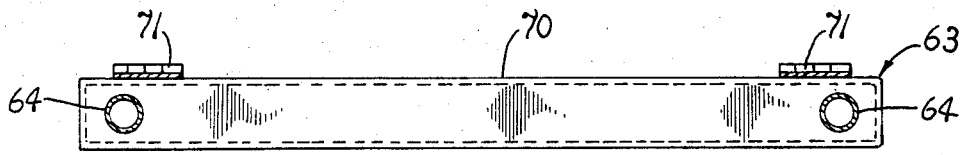
FIG. 7 is a somewhat enlarged transverse vertical section of the second form of the invention.
Figure 8:
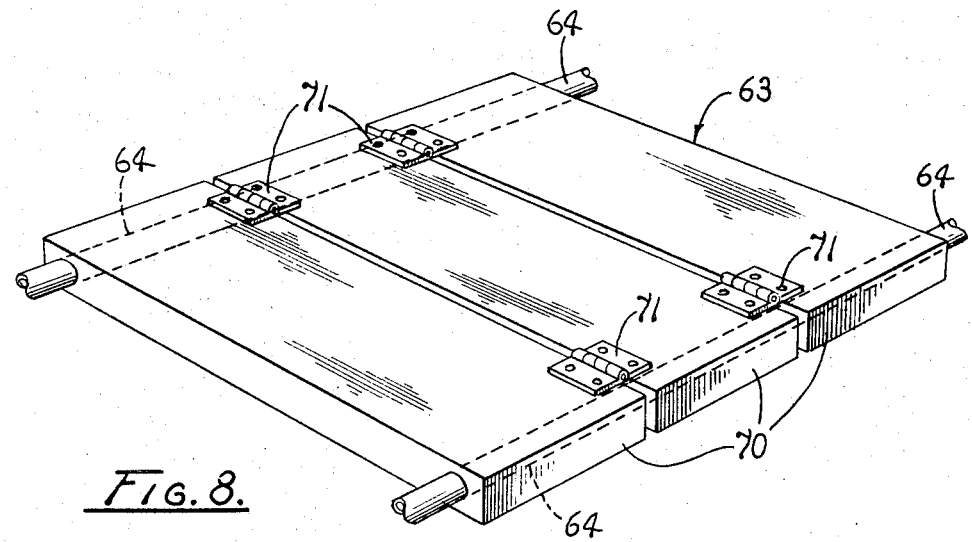
FIG. 8 is a fragmentary perspective of the second form of the invention.

The floating bridge further incudes a floatation ramp 63 which is normally coiled on the mobile vehicle 61, as shown in dashed lines in FIG. 6. The floatation ramp has a pair of parallel flexible pressure conduits 64 which are operably connected to the air pressurizing unit 62 of the mobile vehicle 61. The pressure conduits can be of any desired length as determined by the distance to be crossed and have airtight distal ends 65. A plurality of rectangular hollow pontoon or floatation members 70 are mounted in side-by-side relation normal to, between and extending throughout the entire length of the pressure conduits. Each of the floatation members is mounted on the pressure conduits so that the conduits extend through the floatation member, as shown best in FIG. 7. The floatation members are held in interconnecting relation by hinges 71.

THIRD FORM

The third form of the present invention is intended for use as an irrigation system or apparatus 80 which is operated as a segmented mechanical proboscis according to the same principles as the first and second forms of the invention. The irrigation apparatus can take several forms within the scope of the invention one of which is shown in FIGS. 9, 10, and 11. This form of the irigating apparatus includes a main conduit 81 which is buried below the surface of the ground 82. A plurality of stand pipes or pressure heads 83 are mounted in spaced relation along the length of the main conduit and extend vertically a short distance above the surface of the ground. Only one of the pressure heads is seen in FIGS. 9 and 10. Preferably a fluid pressurizing unit, not shown, is located in connection with the main conduit rather than within each pressure head in order to simplify its structure and operation.

Any desired number of flexible pressure conduits 84 of a predetermined length are mounted in selected positions on the pressure heads 83. The number, length, and position of each pressure conduit is determined by the requirements of the area to be irrigated. Each of the pressure conduits has a water tight distal end 85. The conduits are in operable connection with their respective pressure head and are adapted to receive water under pressure therefrom. A plurality of sprinkler heads 86 are mounted on each of the pressure conduits so that they face in an upward direction when the irrigating apparatus 80 is disposed in the arrangement shown in FIG. 9.

A tapered support boom 34 is mounted on each of the pressure conduits 84, as shown in FIGS. 9, 10, and 11. The support boom includes a boom mount 35 which is affixed to its respective pressure head about its respective pressure conduit. The boom mount of each pressure conduit is semi-circular in cross section and extends substantially horizontally from its standpipe. A support brace 36 is mounted on the pressure head in supporting relation to each of the boom mounts. A plurality of support segments 41 are mounted in interconnecting end-to-end relation along each of the pressure conduits, as best shown in FIG. 9. Each of the support segments is of the same general configuration as the boom mount, being semi-circular in cross section for structural rigidity. However, moving from the pressure head to the distal end of the conduit the support segments are progressively tapered as shown in FIG. 9. Each support segment has an inner end 42 and an outer end 43. A pair of parallel relatively narrowly spaced pivots 44 is integrally provided on the inner end of each support segment. A pair of parallel relatively widely spaced pivots 45 is integrally provided on the outer end of each support segment with the exception of the segment enclosing the distal end 85 of the pressure conduits. The remote horizontally extending end of the boom mount also has a pair of the relatively widely spaced pivots. The narrowly spaced pivots of the inner end of each support segment are rotatably mounted in the widely spaced pivots of the outer end of the support segment or boom support adjacent thereto. A torsion spring 52 can be positioned adjacent to each of the interconnecting pivots 44 and 45 and have its distal end individually affixed to the connected support segments, as shown best in FIG. 11 in order to facilitate recoiling of the support boom. The boom mount and support segments are attached to their respective pressure conduit by any suitable means.

Although not herein shown or fully described, as an indication of the wide variety of uses of the segmented mechanical proboscis of the present invention, let us briefly consider the inventions application to a fishing pole. Such a fishing pole could be segmented and have a pressure conduit as in the other forms of the invention. Thus a fishing pole of this type would be retractable as in the previously discussed forms of the invention to a minimum size in order to permit it to be stored easily or carried without requiring disassembly as in previous fishing poles. Furthermore, it could be extended to its operational length through the use of an inexpensive carbon dioxide cartridge. Thus, it is believed readily apparent that the device of the present invention has a virtually endless number of possible adaptations.

OPERATION—FIRST FORM

The operation of the described embodiments of the subject invention is believed to be readily apparent and is briefly summarized at this point. As previously stated, the segmented mechanical proboscis of the mobile working tower 10 is adaptable for use on stationary platforms or movable platforms such as provided by trailers, service trucks, fire engines, or the like. When not in use, the support boom 34 is coiled with the bucket 54 resting on the support table 22 which in turn is in the lowered horizontal position resting on the upper end 16 of the mounting head 14 with the pneumatic ram 25 contracted, as shown in FIG. 2. Of course, at this time, the air pressurizing unit 25 is not operating and thus the lifting conduit 32 remains in a flexible condition thus accounting for the coiled arrangement of the support boom. When the automotive vehicle 11 on which the support boom is mounted is moved to a position for work, the person who is to perform whatever operation is to be done can either ride in the bucket as it is elevated or climb the ladder 47 once it is elevated. Of course, it is obvious that great time and effort can be saved by riding up with the bucket.

In either event, the pneumatic ram 25 is expanded, by means of the air pressurizing unit 26, a predetermined extent so that the support table is rotated on the rotation assembly 21 of the mounting head 14 to a predetermined angle in order to facilitate the uncoiling of the support boom 34. The air pressurizing unit is subsequently activated to cause air to travel through the pneumatic conduit 30 and into the lifting conduit 32. By controlled increasing pressurization of the air within the lifting conduit, the conduit uncoils to a more natural straightened arrangement in the well-known manner. Under the force of the straightening lifting conduit and with the advantage of gravity as a result of the tilted support table, the support boom is caused to uncoil to a straightened position, as best shown in FIG. 1. Each of the support segments 41 pivots against the force of its torsion spring 52 so that its outer end 43 and inner end 42 are in abutment against the inner end and outer end respectively of its adjacent support segments. Because of the straightening of the support boom, the bucket is lifted from the support table and elevated until the support boom reaches its fully straightened position. Throughout the lifting operation the bucket is maintained in the position as shown in FIGS. 1 and 2 by gravity and because of its pivotal mounting in the rotation assembly 53 and low center of gravity thus maintaining a person carried in the bucket in upright position.

Once the mobile working tower 10 is arranged in the position, as shown in FIG. 1, the support boom 34 can be adjusted to the proper position for performing the desired operations. Thus, utilizing the drive motor 15, the support boom can be moved if necessary in a complete circle through the action of the worm gear 20 in engagement with the rotation gear 18. The precise elevation of the bucket can be adjusted by means of the pneumatic ram 25 positioning the support table. The climbing ladder 47 can be utilized by the operator or by other individuals to move back and forth to the bucket while the support boom is in its upwardly extended position.

Upon completion of the working operations, the operator can either climb down from the bucket 54 on the climbing ladder 47 or can ride down with the bucket as the support boom 34 is returned to its coiled position. In either event when it is desired to lower the support boom, a controlled releasing of pressure within the lifting conduit 32 is performed by the air pressurizing unit 26. As is believed readily apparent, the support boom at this time should be positioned at an angle to the ground sufficient to counteract the force of gravity absorbing the coiling tendency of the torsion springs 52 of the support segment closest to the bucket. Thus, the support segment on which the bucket is rotatably mounted is caused by its torsion spring, the angle of the boom, and the controlled releasing of pressure from the lifting conduit to move away from abutment against its adjacent support segment. The weight of the support boom extending above each of the other segments prevents their being caused to coil out of succession with the other support segments. Consequently, the support segments begin coiling at the end of the support boom adjacent to the bucket. Under controlled depressurization of the lifting conduit and angling of the support boom to the ground, coiling of the support boom is controlled to proceed as rapidly or as slowly as is desired. Simultaneously, as pressure is released the support table 22 can be lowered toward the position parallel to the pivot gear, as shown in FIG. 2, utilizing pneumatic ram 25 until the bucket is received in resting relation on the support table and the support boom is completely coiled. The automotive vehicle 11 is then ready for transport with the support boom and related equipment compactly disposed thereon.

Thus, the mobile working tower 10 of the first form of the present invention provides a compact and easily operable working tower which is quick to deploy to its fully operational configuration and is quick to retract to a compact configuration for travel. Furthermore, utilizing the unique physical characteristics of the segmented mechanical proboscis, the device requires no extensive or bulky support equipment. Because of its pneumatic actuation, the device eliminates the necessity for bulky and ordinarily messy hydraulic equipment which ordinarily requires large quantities of hydraulic fluid. The mobile working tower is adaptable to perform a wide variety of operations such as fruit picking, telephone and power line repair work, fire fighting, and general servicing operations.

SECOND FORM

The operation of the second form of the present invention is substantially similar in principle to the first form of the invention since it also takes the form of a segmented mechanical proboscis. When it is desired to cross a body of water 80 such as a lake, river, swamp, or the like, the mobile vehicle 61 of the portable floating bridge 60 is positioned adjacent thereto, as shown in FIG. 6. The air pressurizing unit 62 is then activated causing pressurized air to be forced into the pair of pressure conduits 64 thus forcing the conduits to straighten. Under the force of the straightening conduits, the floatation ramp uncoils from the vehicle and across the body of water. The buoyancy of each floatation member 70 is so great and the weight thereof so insignificant that the uncoiling portion of the ramp is only slightly submerged. When the floatation ramp completely uncoils, the airtight distal ends 65 of the pressure conduits may be fastened in any suitable manner to the shore opposite from the mobile vehicle.

The floatation ramp 63 is then ready for use and is, of course, maintained in a floating relation across the body of water by the floatation members 70. Since an important feature of the portable floating bridge is its quick operational deployment, no mechanical means is provided for recoiling of the ramp because such mechanical means would inherently inhibit quick deployment of the bridge. Thus, for example in military operations, after troops have used the bridge to cross the body of water, the floatation ramp would probably be left to be recoiled at a more convenient time by supporting personnel which were not directly involved in the military operation. Recoiling of the floatation ramp would probably be performed by pulling it onto the land and recoiling it manually. After recoiling, the floatation ramp can again be mounted on the mobile vehicle, as shown in dashed lines in FIG. 6. Obviously, it might be more convenient for the bridge simply to be disconnected from the mobile vehicle after use without bothering to recoil it. Since the construction of the floatation ramp is quite simple and uncomplicated, a single use of such floatation ramps would not be prohibitively expensive for remote military operations.

The advantages of the portable floating bridge 60 of the second form of the present invention are believed readily apparent. The floating bridge requires no pre-existing auxiliary objects, such as trees or the like as normally do other temporary bridges. Furthermore, because of its compact configuration, the portable floating bridge is highly mobile and is obviously adaptable to being parachuted into rugged areas which prevent or inhibit wheeled transport. Furthermore, as in the first form of the invention, because of the utilization of a segmented mechanical proboscis the device is of quite simple construction, is quite easily and quickly deployable, and is fully effective in performing its designed function.

THIRD FORM

The operation of the third form of the present invention is substantially similar to the first and second forms of the invention since it also is a segmented mechanical proboscis. When the irrigating apparatus 80 is not being used it is disposed in the arrangement shown in FIG. 10. Since, when it is not being used, water is not being forced under pressure into the pressure conduits 84 they remain coiled. Due to the tapered configuration of each support boom, each successive support segment 41 is partially receivable in its larger adjacent segment thus permitting the support boom to be fairly tightly coiled as shown in FIG. 10. So retracted, other agricultural operations such as cultivating and harvesting can be performed without the necessity of disassembling the apparatus or slowing the work to prevent inadvertent damaging of the apparatus.

When the area is to be irrigated, it is merely necessary to force water under pressure through the main conduit 81 from any suitable source, not shown. Consequently, the pressurized water is forced through the pressure heads 83 and into the pressure conduits 84. The pressure conduits accordingly become rigid thus extending their support booms 34 until they are fully extended horizontally over the surface of the ground 82, as shown in FIG. 9. Little or no manual assistance is needed to extend the support booms.

Simultaneously the water is continuously discharged through the sprinkler heads 86 of the pressure conduits 84. Obviously the water pressure must be continually maintained in order to keep the support booms extended. It is desirable to place a block or other suitable support 90 under the support segment 41 at the distal end 85 of each pressure conduit in order to give added support to the apparatus.

Thus, the third form of the present invention is adaptable to large scale farming operations. It is believed that its greatest advantage lies in the fact that it operates automatically or semi-automatically in extending to perform irrigating operations and in retracting to allow other operations to be performed.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An extensible mechanism comprising a sealed flexible inflatable conduit having a plurality of elongated, interconnected, relatively pivotal segments which when deflated is in a coiled configuration, a pressure unit adapted to supply fluid pressure to the conduit to cause it to uncoil and subsequently to take a substantially straightened configuration for the support of a work load, and work load supporting means borne by the conduit.

2. The extensible mechanism of claim 1 wherein said conduit mounts a plurality of load support elements linked to the conduit and in linear adjacent pivotal relation thus permitting rapid deployment from the coiled condition of the conduit upon actuation of the pressure unit.

3. The extensible mechanism of claim 2 wherein said conduit also mounts a plurality of sprinkler heads which are operably in communication with the pressure unit so that when said conduit is deployed, fluid is discharged therethrough.

4. The extensible mechanism of claim 2 wherein the conduit and associated work support elements include flotation means so that, upon positioning of the extensible mechanism adjacent to a body of water and upon actuation of said pressure unit, the work support segments and floatation means are forced out over the body of water with the straightening conduit thus forming a floating bridge.

5. A segmented mechanical proboscis comprising a pressure unit; an elongated flexible fluid tight conduit mounted at one end in operable association with the pressure unit and having a closed distal end, the pressure unit being adapted to pressurize and make rigid the conduit upon actuation, said conduit being disposed in coiled configuration to which it tends to return when deflated; a plurality of support elements pivotally interconnected in end-to-end relation mounted along the conduit; and a work platform mounted at the closed distal end of the conduit so that, upon actuation of the pressure unit, said conduit uncoils to an elevated straightened position and is supported therein by the pressure within the conduit and by the support elements so that work can be performed from the elevated work platform.

6. The segmented mechanical proboscis of claim 5 wherein the work platform is pivotally mounted on the closed distal end of the conduit and has a center of gravity below said pivotal mounting so that as said conduit is uncoiled, the work platform is maintained by gravity in a work position.

7. The segmented mechanical proboscis of claim 6 wherein each support element is tensionably connected to its adjacent support element so that upon the controlled releasing of the pressure within the conduit, the support elements begin recoiling the conduit from its closed distal end and successively toward the mounting end thereof.

8. The segmented mechanical proboscis of claim 5 including an adjustably tipped base, and means mounting the conduit and support elements thereon whereby said conduit and support elements are positionable in order most advantageously to position the work platform with respect to the work to be performed.

References Cited

UNITED STATES PATENTS

| | | | |
|---|---|---|---|
| 328,345 | 10/1885 | Sees | 182—141 |
| 609,281 | 8/1898 | Turner et al. | 182—41 |
| 3,050,152 | 8/1962 | Blain | 182—41 |
| 3,284,964 | 11/1966 | Saito | 52—2 |
| 3,298,142 | 1/1967 | Isaac | 52—2 |
| 3,314,200 | 4/1967 | Schuster | 182—41 |

REINALDO R. MACHADO, *Primary Examiner.*

U.S. Cl. X.R.

14—27; 52—2